(12) United States Patent
Zeng et al.

(10) Patent No.: US 10,476,870 B2
(45) Date of Patent: Nov. 12, 2019

(54) LOCAL CLAIM-BASED SECURITY SERVICE WITH CROSS-BROWSER COMPATIBILITY

(71) Applicant: Microsoft Technology Licensing, LLC, Redmond, WA (US)

(72) Inventors: Yi Zeng, Bothell, WA (US); Yu Huang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

(21) Appl. No.: 15/686,391

(22) Filed: Aug. 25, 2017

(65) Prior Publication Data
US 2019/0068585 A1  Feb. 28, 2019

(51) Int. Cl.
*H04L 29/06* (2006.01)
*G06F 21/34* (2013.01)

(52) U.S. Cl.
CPC .......... *H04L 63/0853* (2013.01); *G06F 21/34* (2013.01); *H04L 63/0807* (2013.01); *H04L 63/0884* (2013.01)

(58) Field of Classification Search
None
See application file for complete search history.

(56) References Cited

U.S. PATENT DOCUMENTS

| 7,200,756 | B2* | 4/2007 | Griffin | G06F 21/602 |
| | | | | 705/41 |
| 7,748,609 | B2 | 7/2010 | Sachdeva et al. | |
| 8,095,972 | B1 | 1/2012 | Floyd et al. | |
| 8,893,293 | B1* | 11/2014 | Schmoyer | H04L 63/0807 |
| | | | | 726/26 |
| 9,077,713 | B1 | 7/2015 | Zheng et al. | |
| 2008/0120412 | A1* | 5/2008 | Icaza | H04L 67/16 |
| | | | | 709/225 |
| 2008/0178272 | A1* | 7/2008 | Gajjala | G06F 21/33 |
| | | | | 726/6 |
| 2010/0154041 | A1 | 6/2010 | Dalzell et al. | |

(Continued)

FOREIGN PATENT DOCUMENTS

WO  2016183281 A1  11/2016

OTHER PUBLICATIONS

Leicher et al.; Smart OpenID: A Smart Card Based OpenID Protocol; 2012; Retrieved from the Internet <URL: https://link.springer.com/chapter/10.1007/978-3-642-30436-1_7>; pp. 1-12, as printed. (Year: 2012).*

(Continued)

*Primary Examiner* — Saleh Najjar
*Assistant Examiner* — Michael W Chao
(74) *Attorney, Agent, or Firm* — Christopher J. Volkmann; Kelly, Holt & Christenson, PLLC (57) ABSTRACT

A web application that is attempting to access a site hosted by a system that needs authentication based on a hardware-protected key is redirected to a local authority service on the machine. The local authority service interacts with a hardware key reader to obtain authentication information from a hardware key holder. The local authority service illustratively interacts with the system being accessed in order to obtain an operation result, based on the hardware-protected key obtained through the hardware key reader. The operation result is then posted to the web application, by the local authority service, for use in authenticating the user.

20 Claims, 8 Drawing Sheets

(56) References Cited

U.S. PATENT DOCUMENTS

| | | | |
|---|---|---|---|
| 2010/0199089 A1 | 8/2010 | Vysogorets | |
| 2011/0041165 A1* | 2/2011 | Bowen | H04L 63/08 726/5 |
| 2011/0225637 A1* | 9/2011 | Counterman | G06F 21/6245 726/7 |
| 2011/0225641 A1* | 9/2011 | Wu | H04L 63/08 726/9 |
| 2013/0227658 A1* | 8/2013 | Leicher | H04L 63/0876 726/5 |
| 2016/0087957 A1* | 3/2016 | Shah | H04L 63/205 726/1 |
| 2017/0374070 A1* | 12/2017 | Shah | H04L 63/20 |

OTHER PUBLICATIONS

Sakimura et al.; OpenID Connect Core 1.0; 2014; retrieved from the Internet <URL: https://openid.net/specs/openid-connect-core-1_0.html>; pp. 1-78, as printed. (Year: 2014).*

"How to Self-Enroll a YubiKey 4 for Use with All Browsers", In Virginia Tech, College of Engineering, Retrieved on: Jul. 26, 2017, 1 Page.

Dmitriil., "Authentication Assurance and Claims Based Authentication", Retrieved From <<https://blogs.technet.microsoft.com/dmitrii/2012/06/27/authentication-assurance-and-claims-based-authentication/>>, Jun. 27, 2012, 3 Pages.

Dmitriil., "Levels of Assurance and Claims-based Authentication", Retrieved From <<https://blogs.technet.microsoft.com/dmitrii/2010/06/02/levels-of-assurance-and-claims-based-authentication/>>, Published on: Jun. 2, 2010, 1 Page.

Sachdeva, et al., "A Browser-Based Approach to Smart Card Connectivity", In IEEE Workshop on Web, vol. 2, Jan. 1, 2009, 4 Pages.

"Secure login with smart cards on smartphones and tablets", Retrieved From <<https://app.leadsius.com/uploads/accounts/786/5631d77574de2.pdf>>, Retrieved on: Jul. 26, 2017, 2 Pages.

Claims-Based Architectures, Retrieved From <<https://msdn.microsoft.com/en-us/library/ff359108.aspx>>, Retrieved on: Jul. 26, 2017, 22 Pages.

"International Search Report and Written Opinion Isssued in PCT Application No. PCT/US2018/037669", dated Oct. 11, 2018. 11 Pages.

* cited by examiner

LOCAL CLAIM-BASED SECURITY SERVICE WITH CROSS-BROWSER COMPATIBILITY

BACKGROUND

Computing systems are currently in wide use. Some computing systems include data centers. A data center may have a large number of networked computer servers and data storage resources. Such servers are used by organizations (sometimes referred to as tenants) for the remote storage, processing or distribution of large amounts of data. They can include server and networking systems and they also often include security devices or components.

Data centers often have a frontend system that is used by engineers or other technical or administrative personnel in order to maintain the components of the data center. Data centers may also include a backend system which has servers that perform backend processing, such as data manipulation, security or authentication processing, among other things.

Some computing systems also require a variety of different types of authentication. For instance, a computing system may require multi-factor authentication. This means, for example, that the system requires a user to provide more than one type of authentication in order to access the computing system or certain components of the computing system. Some multi-factor authentication systems, for instance, provide mechanisms so that the user seeking to access protected resources may need to input his or her user name and password, as well as a hardware-protected authentication value, such as a hardware-protected key. A hardware-protected key may be, for instance, a key that is stored on a smart card. Smart cards are also sometimes referred to as chip cards or integrated circuit cards (ICCs). Smart cards are normally plastic cards that have a built-in microprocessor or micro-controller with some internal memory, or they may be cards with a memory chip. The smart card connects to a reader with direct physical contact or with a contactless interface. While a smart card is referred to as a "card", it can take a variety of different forms, such as plastic cards, key FOBs, USB-based tokens, among a wide variety of other things.

Smart cards often include encryption components and other components which may be used to generate keys, provide secure key storage, provide hashing and digital signing capabilities, among other things.

The discussion above is merely provided for general background information and is not intended to be used as an aid in determining the scope of the claimed subject matter.

SUMMARY

A web application that is attempting to access a site hosted by a system that needs authentication based on a hardware-protected key is redirected to a local authority service on the machine. The local authority service interacts with a hardware key reader to obtain authentication information from a hardware key holder. The local authority service illustratively interacts with the system being accessed in order to obtain an operation result, based on the hardware-protected key obtained through the hardware key reader. The operation result is then posted to the web application, by the local authority service, for use in authenticating the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As described above, some remote computing systems require multi-factor authentication for a user to access resources on the computing system. The multi-factor authentication may include authentication based on a hardware-protected key, such as a key stored on a smart card. Users also often use a web application (such as a browser) to access the remote computing system where the authentication is required. By way of example, it may be that the remote computing system (e.g., a data center) requires a claim-based token that is signed by the hardware-protected key. It is difficult, however, to sign a claim-based token in a browser because the operation of accessing a hardware-protected key (using a hardware key reader, such as smart card reader), is not well supported in many browsers. Each different browser often has its own solution for inter-operation with a local hardware key reader. For example, some browsers may use ActiveX controls to interact with a hardware key reader (e.g., a smart card reader) while other browsers use a web USB API in order to interact with the hardware key reader. The browsers also often change how they interact with hardware key readers, to enhance security. It is thus difficult to find a stable implementation, even in a single browser. Therefore, inserting customized code into a browser, in order to perform authentication based on a hardware-protected key, can be very difficult. It is difficult to support multiple different browsers, and it is difficult to find a stable implementation even in a single browser.

Figure 1:
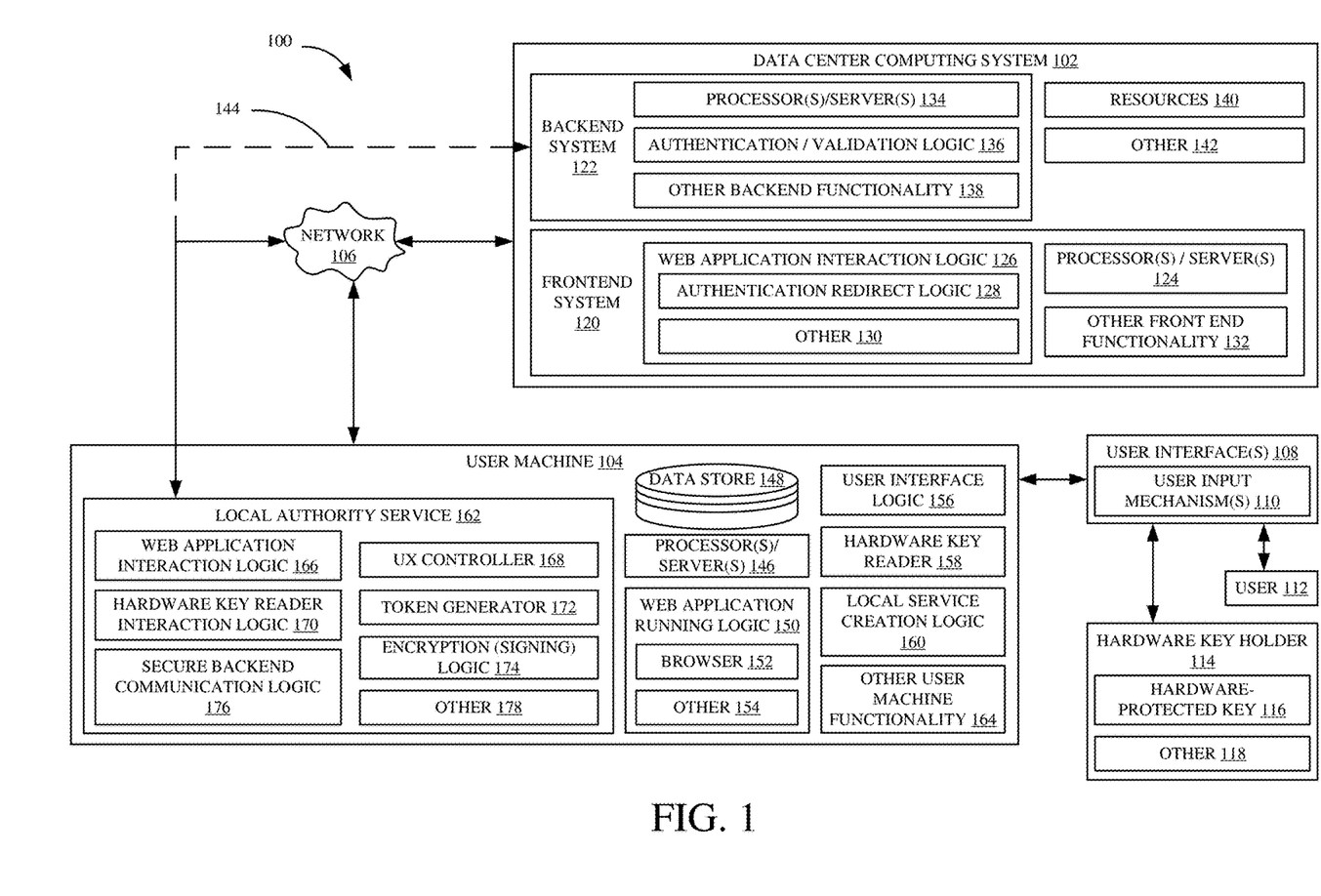
FIG. 1 is a block diagram of one example of a computing system architecture.

The discussion below is directed to using a browser to obtain a signed, claim-based token for authentication, that is signed using a hardware-protected key, without inserting custom code into the browser. FIG. 1 shows a block diagram of one example of a computing system architecture 100 where this can be done.

In the example shown in FIG. 1, architecture 100 illustratively includes data center 102 which can be accessed by a user machine 104 over network 106. Network 106 can be a wide area network, a local area network, a nearfield communication network, a cellular communication network, or a wide variety of other networks or combinations of networks.

FIG. 1 also shows that, in one example, user machine 104 generates or provides one or more user interfaces 108 with user input mechanisms 110 for interaction by user 112. The user 112 illustratively interacts with user input mechanisms 110 in order to control and manipulate user machine 104, and some parts of data center computing system 102. FIG. 1 also shows that, in one example, a user 112 may have a hardware keyholder 114 (which may be a smart card, chip card, key FOB, etc.). Hardware keyholder 114 illustratively includes hardware-protected key 116, and can include a wide variety of additional or different items 118, such as a microprocessor or microcontroller, memory, encryption functionality, signing functionality, authentication functionality, etc. Before describing the overall operation of architecture 100 in more detail, a brief description of some of the items on data center computing system 102 and user machine 104, and their operation, will first be provided.

In the example shown in FIG. 1, data center computing system 102 illustratively includes frontend system 120 and backend system 122. Frontend system 120 can include one or more processors or servers 124, and web application interaction logic 126, which, itself, includes authentication redirect logic 128, and it can include other things 130. Frontend system 120 can also include a wide variety of other frontend functionality 132. Backend system 122 illustratively includes one or more processors or servers 134, authentication/validation logic 136, and it can include a wide variety of other backend functionality 138. Data center computing system 102 can include a wide variety of other resources 140, and it can include other things 142.

It will be noted that the processors and/or servers 124 and 134 can be virtual machines or different physical hardware processors. Web application interaction logic 126 exposes an interface for interaction with various web applications (such as browsers) that may be used by different users or tenants in order to access resources 140 on data center computing system 102. Authentication redirect logic 128 will, as is described in greater detail below, redirect a web application (that is being used by the tenant or user to access data center computing system 102) to a local security service on the user's machine, in order to conduct authentication processing. Web application interaction logic 126 can illustratively receive a request to access resources 140, through an exposed interface, and provide those requests to backend system 122 where the processors/servers 134, and other backend functionality 138, facilitate the requested access. Authentication/validation logic 136, as is also discussed in greater detail below, can be accessed either by frontend system 120, or by a service on user machine 104, through a secure communication link 144. Link 144 can go through network 106, or it can be a different type of link directly into backend system 122.

In the example shown in FIG. 1, user machine 104 illustratively includes one or more processors or servers 146, data store 148, web application running logic 150 (which illustratively runs a web application, such as a browser 152), and it can include other things 154. User machine 104 also illustratively includes user interface logic 156, hardware key reader 158, local service creation logic 160, local authority service 162, and it can include a wide variety of other user machine functionality 164.

Web application running logic 150 illustratively runs browser 152 which can use user interface logic 156 to generate user interfaces 108 with user input mechanisms 110, for interaction by user 112. Therefore, user 112 can use browser 152 to navigate to a site where the interfaces exposed by web application interaction logic 126 on frontend system 120 of data center computing system 102 are provided. When this happens, the exposed API may provide methods to receive an authentication input, through which the browser provides authentication information based on a signed, token-based claim that is signed using a hardware-protected key corresponding to the user seeking access. In that case, authentication redirect logic 128 re-directs the browser to local authority service 162, that resides on the user machine 104.

Local authority service 162 can include web application interaction logic 166, user experience (UX) controller 168, hardware key reader interaction logic 170, token generator 172, encryption (signing) logic 174, secure backend communication logic 176, and it can include a wide variety of other items 178. When browser 152 is re-directed to local authority service 162, web application interaction logic 166 exposes an interface that can be accessed by browser 152. UX controller 168 can generate an authentication UX which asks user 112, through a generated user interface 108, to provide his or her hardware-protected key 116 to the hardware key reader 158. Hardware key reader interaction logic 170 then interacts with the hardware key reader 158 to obtain the hardware-protected key 116 (or an encrypted version of it or another representation of it). Token generator 172 then generates a claim-based token and encryption (signing) logic 174 signs the claimed-based token with the hardware-protected key.

Secure backend communication logic 176 then provides the signed, claim-based token to authentication/validation logic 136 over secure communication link 144. In the example illustrated, local authority service 162 is a trusted service, that is trusted by authentication/validation logic 136. Authentication/validation logic 136 then operates on the signed, claimed-based token and returns an operation result through secure backend communication logic 176. The operation result is then posted to browser 152 by web application interaction logic 166, where it can be further processed by browser 152 to authenticate user 112 to data center 102, or for other things.

It should also be noted, before continuing, that many of the functions provided on local authority service 162 may also be provided on hardware keyholder 114 (e.g., on a smart card). For instance, hardware keyholder 114 can include functionality to generate a token, encrypt a token, sign the token, etc.

Figure 2A:
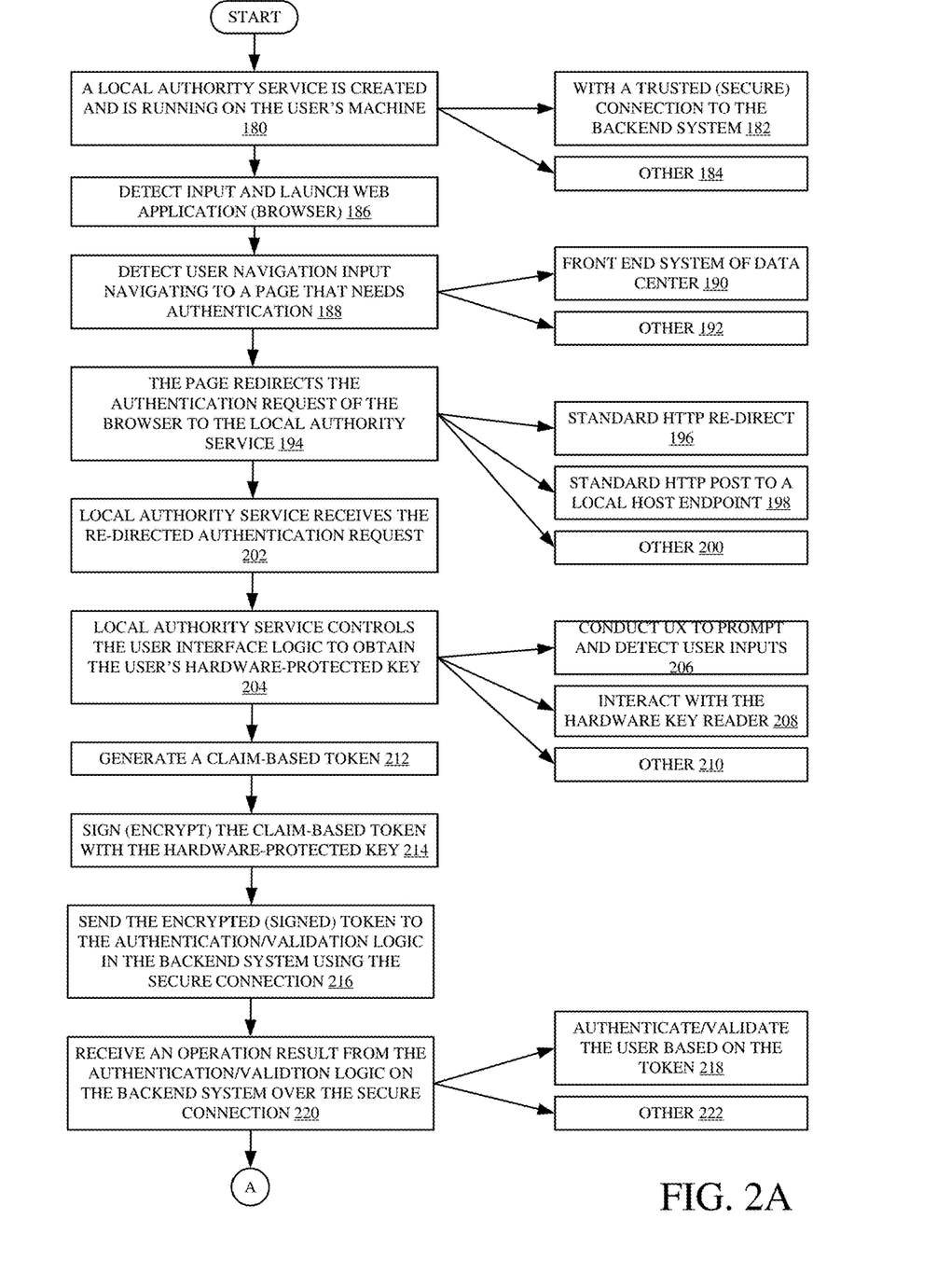
FIGS. 2A and 2B (collectively referred to herein as FIG. 2) illustrate a flow diagram showing one example of the operation of the architecture shown in FIG. 1 in authenticating a user using a web application (e.g., a browser) and using a hardware-protected key.
Figure 2B:
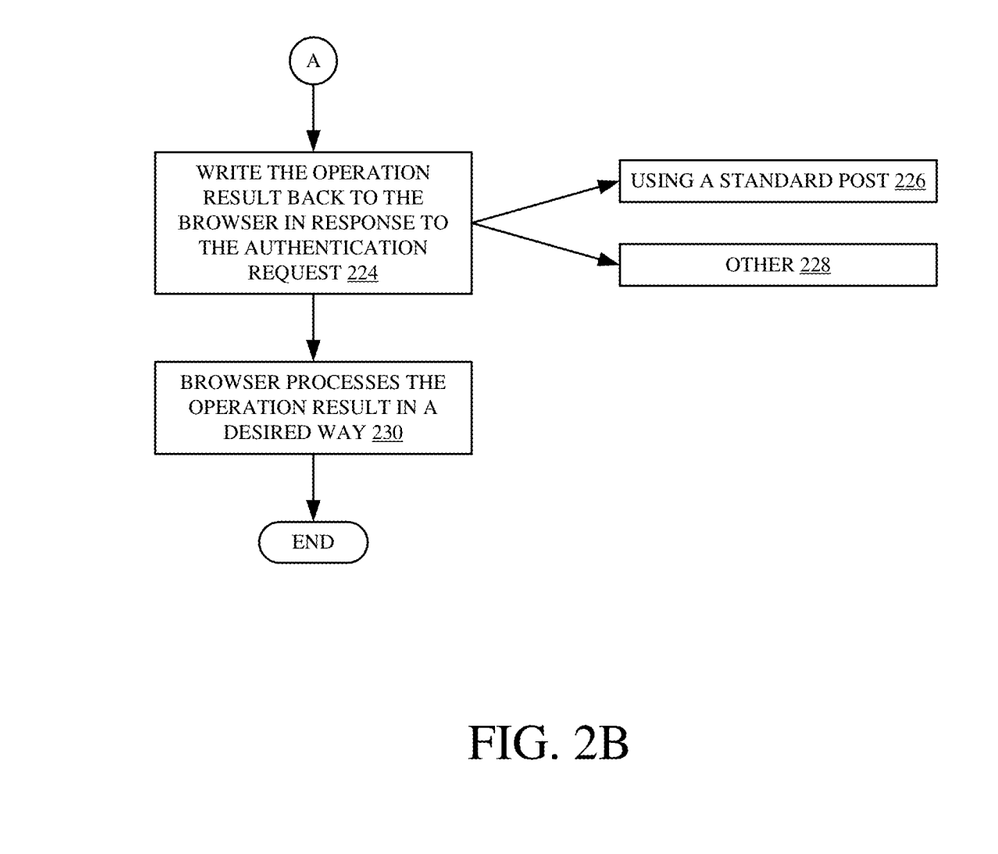

FIGS. 2A and 2B (collectively referred to herein as FIG. 2) provide a flow diagram illustrating one example of the operation of architecture 100, shown in FIG. 1, in more detail. FIGS. 1 and 2 will now be described in conjunction with one another.

It is first assumed that local service creation logic 168 has created local authority service 162 on user machine 104 and that the local authority service is up and running This is indicated by block 180 in the flow diagram of FIG. 2. In one example, local authority service 162 (and particularly secure backend communication logic 176) can be provided with a trusted or secure connection 164 to backend system 122 of data center computing system 102. This is indicated by block 182. Service 162 can be generated in other ways as well, and this is indicated by block 184.

At some point, user 112 will illustratively provide an input through a user input mechanism 110 in order to launch browser 152. In that case, web application running logic 150 will launch and run browser 152 which can generate user interfaces 108 with user input mechanisms 110 (using user interface logic 156, or on its own) for interaction by user 112. Launching the web application (e.g., browser 152) is indicated by block 186 in the flow diagram of FIG. 2.

The browser 152 (or user interface logic 156) then illustratively detects a user navigation input navigating to a page that needs authentication. This is indicated by block 188 in the flow diagram of FIG. 2. For instance, the user may navigate to the site hosted by web application interaction logic 126 of data center computing system 102. This is indicated by block 190. The browser 152 may provide an authentication request, because authentication is needed by data center computing system 102. The user may navigate to another site or navigate in another way as well, and this is indicated by block 192.

The page hosted by web application interaction logic 126 illustratively re-directs the authentication request of the browser 152 to the local authority service 162. This is indicated by block 194 in the flow diagram of FIG. 2. In one example, the process of re-directing browser 152 to local authority service 162 is done by using a standard http re-direct as indicated by block 196, or by using a http post to a local host end point that is monitored by web application interaction logic 166 of the local authority service 162. This is indicated by block 198. The re-direct can be done in other ways as well, as indicated by block 200. However, when it is done using a standard http re-direct or a standard http post, then browser 152 can react to those re-direct operations without any custom code being added to browser 152.

Web application interaction logic 166 then receives the re-directed authentication request (which, itself, may illustratively be an http request) from browser 152. This is indicated by block 202.

In response, the UX controller 168 of local authority service 162 controls user interface logic 156 to obtain the user's hardware-protected key 116. This is indicated by block 204. In one example, UX controller 168 conducts a user experience, which provides one or more user interface displays with user input mechanisms that direct the user to provide the hardware-protected key through hardware key reader 158. The UX controller 168 can also detect user inputs provided in response to those user interfaces. Conducting a user experience to prompt and detect user inputs is indicated by block 206 in the flow diagram of FIG. 2.

Hardware key reader interaction logic 170 then illustratively interacts with the hardware key reader 158, to which user 112 has provided hardware keyholder (e.g., smart card) 114, in order to read hardware-protected key 116, or an encrypted or other representation of it, from hardware keyholder 114. Interacting with the hardware key reader 158 is indicated by block 208 in the flow diagram of FIG. 4. Obtaining the user's hardware-protected key 116 can include other steps and other functionality as well, and this is indicated by block 210.

Token generator 172 then generates a claim-based token and encryption logic 174 then signs (or encrypts) the claim-based token with the hardware-protected key 116. Generating a claim-based token is indicated by block 212 and signing or encrypting that token using the hardware-protected key 116 is indicated by block 214 in the flow diagram of FIG. 2. Again, it will be appreciated that some of these items can be performed on hardware keyholder 114. For instance, hardware keyholder 114 can have token generation functionality and encryption functionality to perform these steps.

Secure backend communication logic 172 then sends the encrypted (or signed) claim-based token to the authentication/validation logic 136 in backend system 122 of data center computing system 102. It is illustratively sent over the secure connection 144. Sending the signed token using the secure connection is indicted by block 216 in the flow diagram of FIG. 2.

Authentication/validation logic 136 then authenticates user 112, or performs another operation, based on the signed, claim-based token and generates a corresponding operation result, and returns the operation result to secure backend communication logic 176. Authenticating or validating the user, or performing another operation on backend system 122, based on the token is indicated by block 218. Receiving the operation result from the authentication/validation logic on the backend system 122 over the secure connection 144 is indicated by block 220. The operation result can be generated and received in other ways as well, and this is indicated by block 222.

Web application interaction logic 166 then writes the operation result back to the browser in response to the authentication request. This is indicated by block 224. Again, this can be done using a standard http post as indicated by block 226, or in other ways as indicated by block 228.

The web application (or browser 152) then processes the operation result in any desired way, in order to complete the authentication of user 112 to data center computing system 102. Having browser 152 process the operation result in a desired way is indicated by block 230 in the flow diagram of FIG. 2.

It can thus be seen that the present system greatly enhances the security of data center computing system 102, without needing to insert any custom code in the web application (e.g., browser) being used to access system 102. Instead, a local authority service, (that is trusted by the backend system 122 of data center computing system 102) is provided on user machine 104 and the authentication request of the web application is redirected to the local authority service. The local authority service interacts with the smart card reader (or hardware key reader) and performs a secure handshake with the authentication/validation logic 136 on backend system 122 over secure link 144 to generate an operation result. The operation result is posted back to the web application where it can be further processed.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 3:
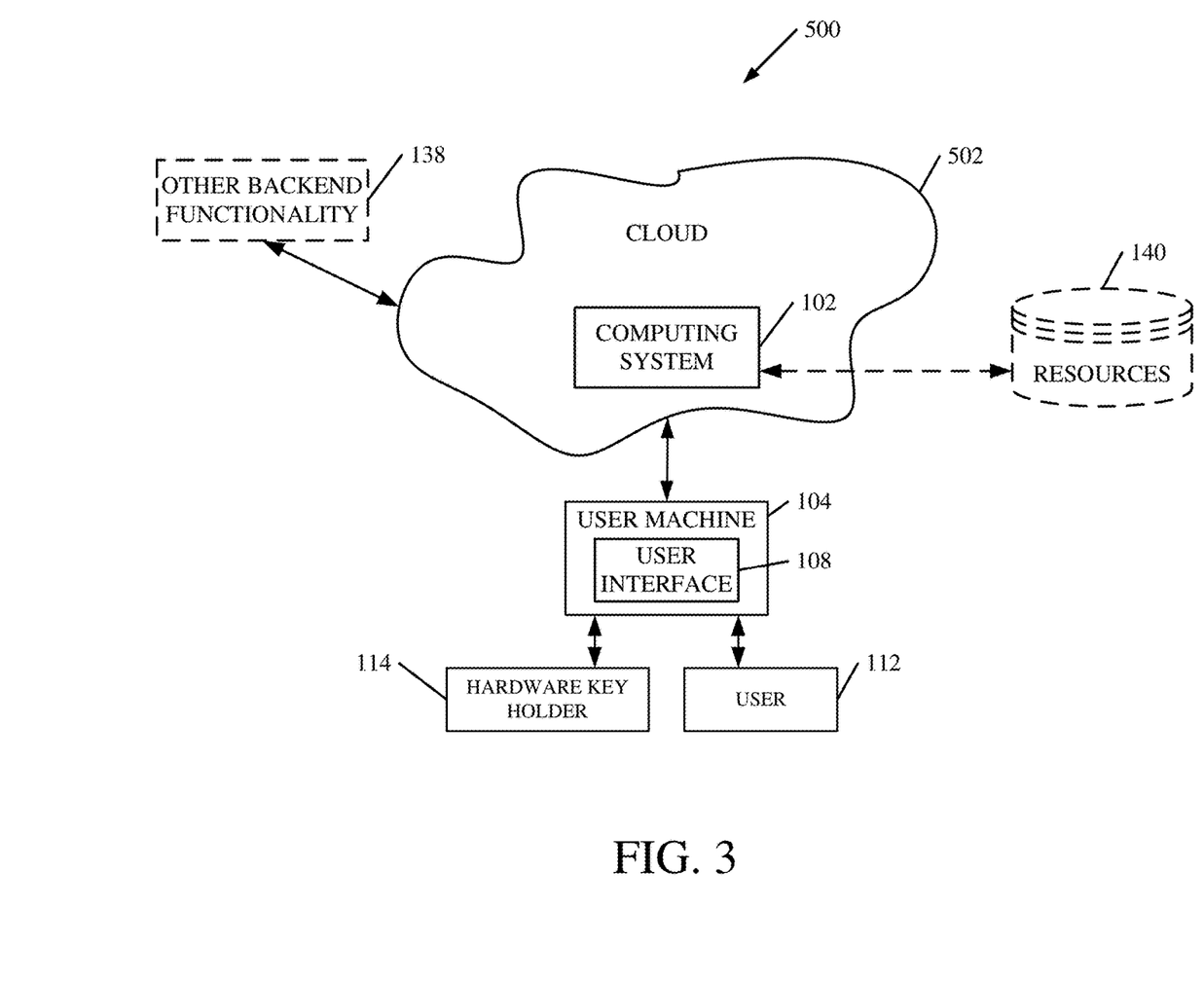
FIG. 3 is a block diagram showing one example of the architecture illustrated in FIG. 1, deployed in a cloud computing architecture.

FIG. 3 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 3, some items are similar to those shown in FIG. 1 and they are similarly numbered. FIG. 3 specifically shows that computing system 102 can be located in cloud 502 (which can be public, private, or a combination where portions are public while others are private). Therefore, user 112 uses user machine 104 to access those systems through cloud 502.

FIG. 3 also depicts another example of a cloud architecture. FIG. 3 shows that it is also contemplated that some elements of computing system 102 can be disposed in cloud 502 while others are not. By way of example, any of the resources 140 can be disposed outside of cloud 502, and accessed through cloud 502. In another example, any backend functionality 138 (or other items) can be outside of cloud 502. Regardless of where they are located, they can be accessed directly by machine 104, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 4:
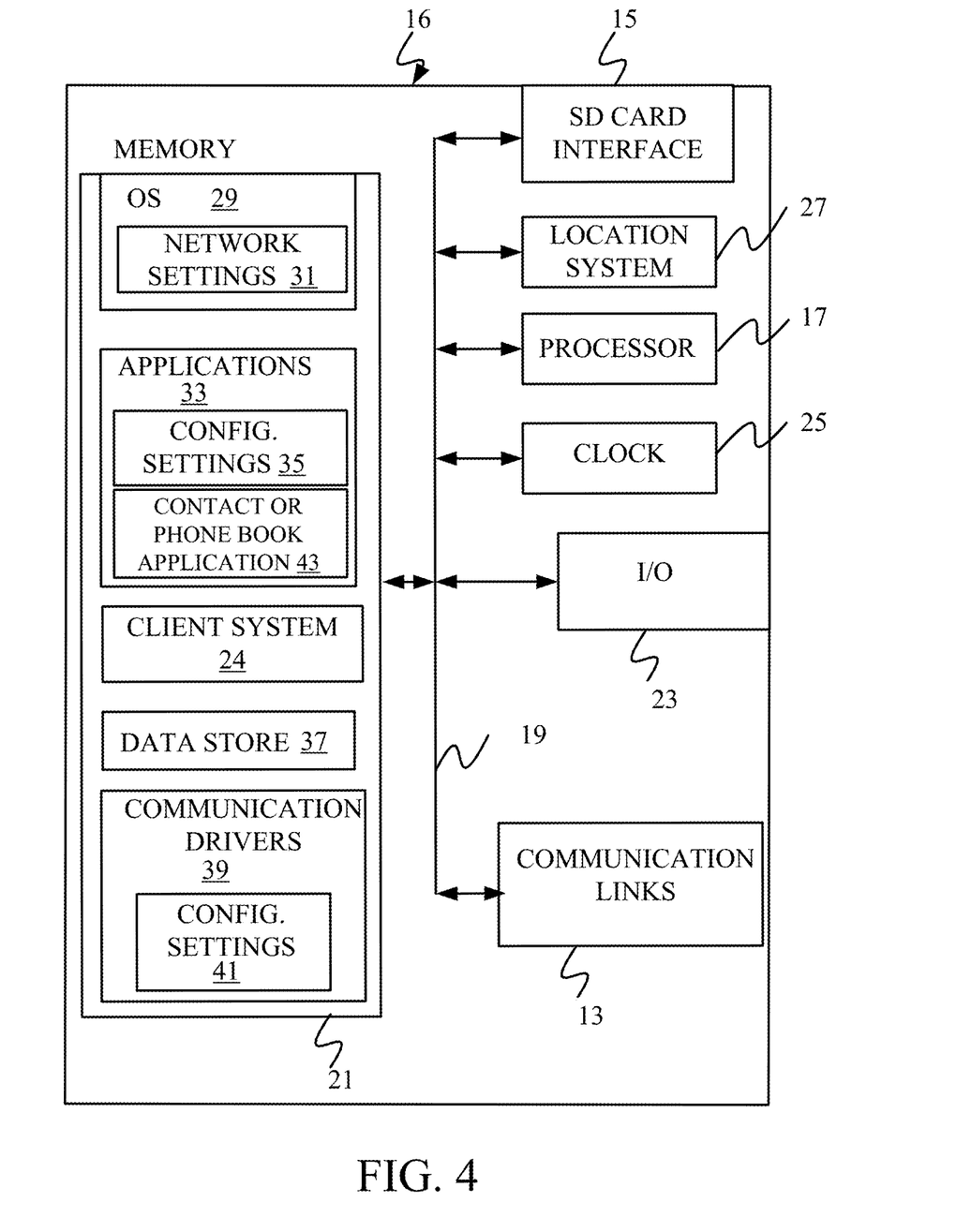
FIGS. 4-6 show examples of mobile devices that can be used in the architectures illustrated in the previous Figures.
Figure 5:
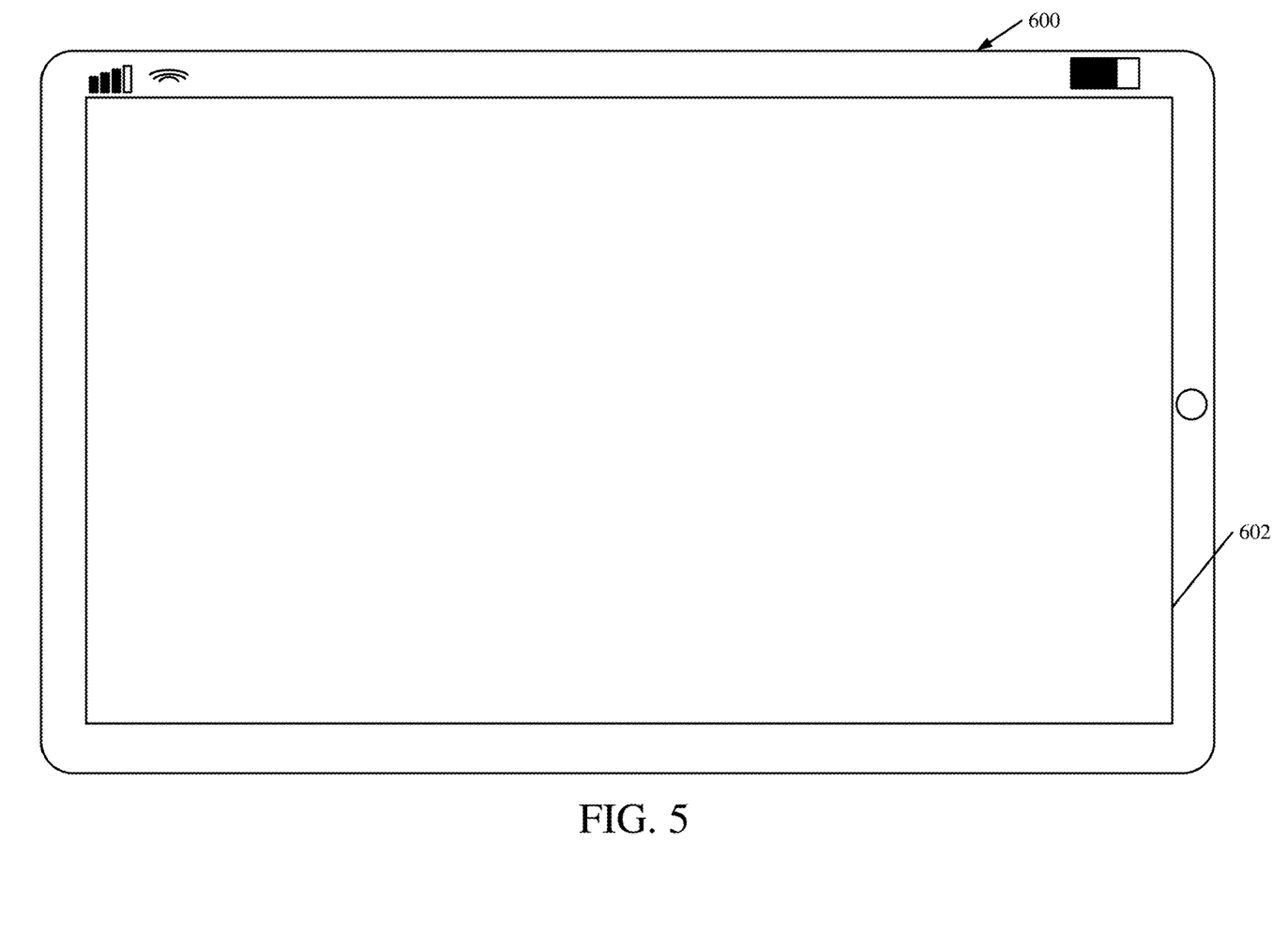
Figure 6:
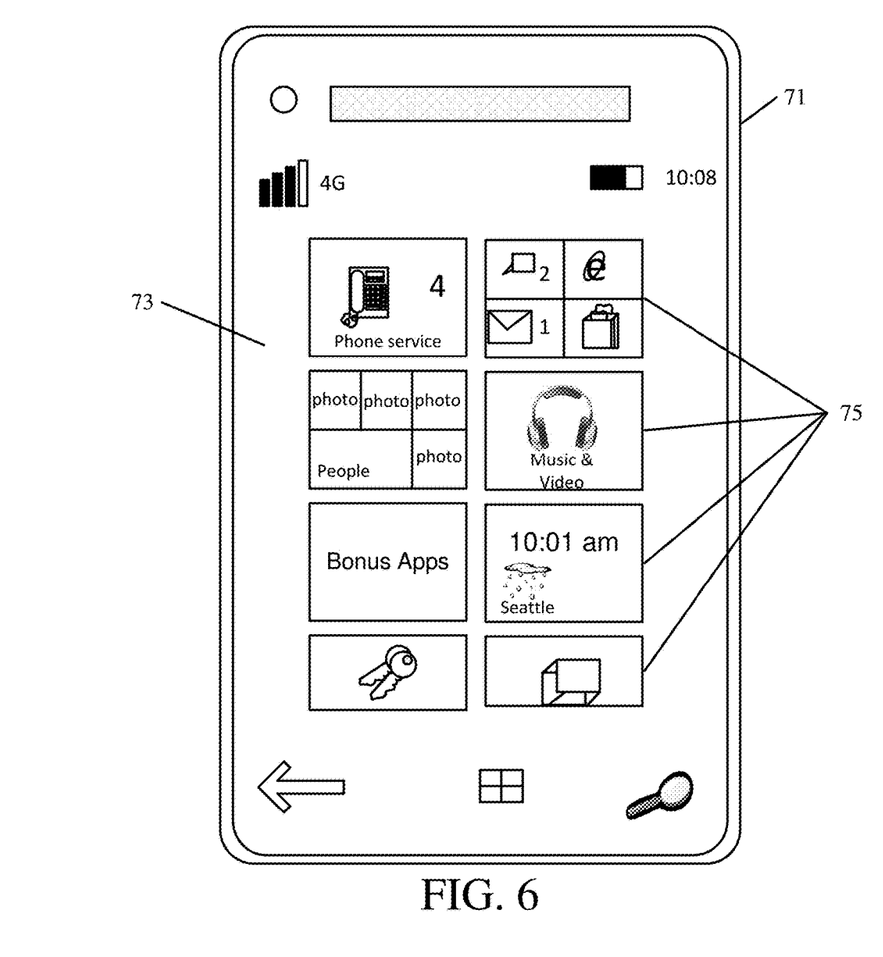

FIG. 4 is a simplified block diagram of one illustrative example of a handheld or mobile computing device that can be used as a user's or client's hand held device 16, in which the present system (or parts of it) can be deployed. FIGS. 5-6 are examples of handheld or mobile devices.

FIG. 4 provides a general block diagram of the components of a client device 16 that can run components computing system 102 or user machine 104 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 5 shows one example in which device 16 is a tablet computer 600. In FIG. 5, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 6 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 7:
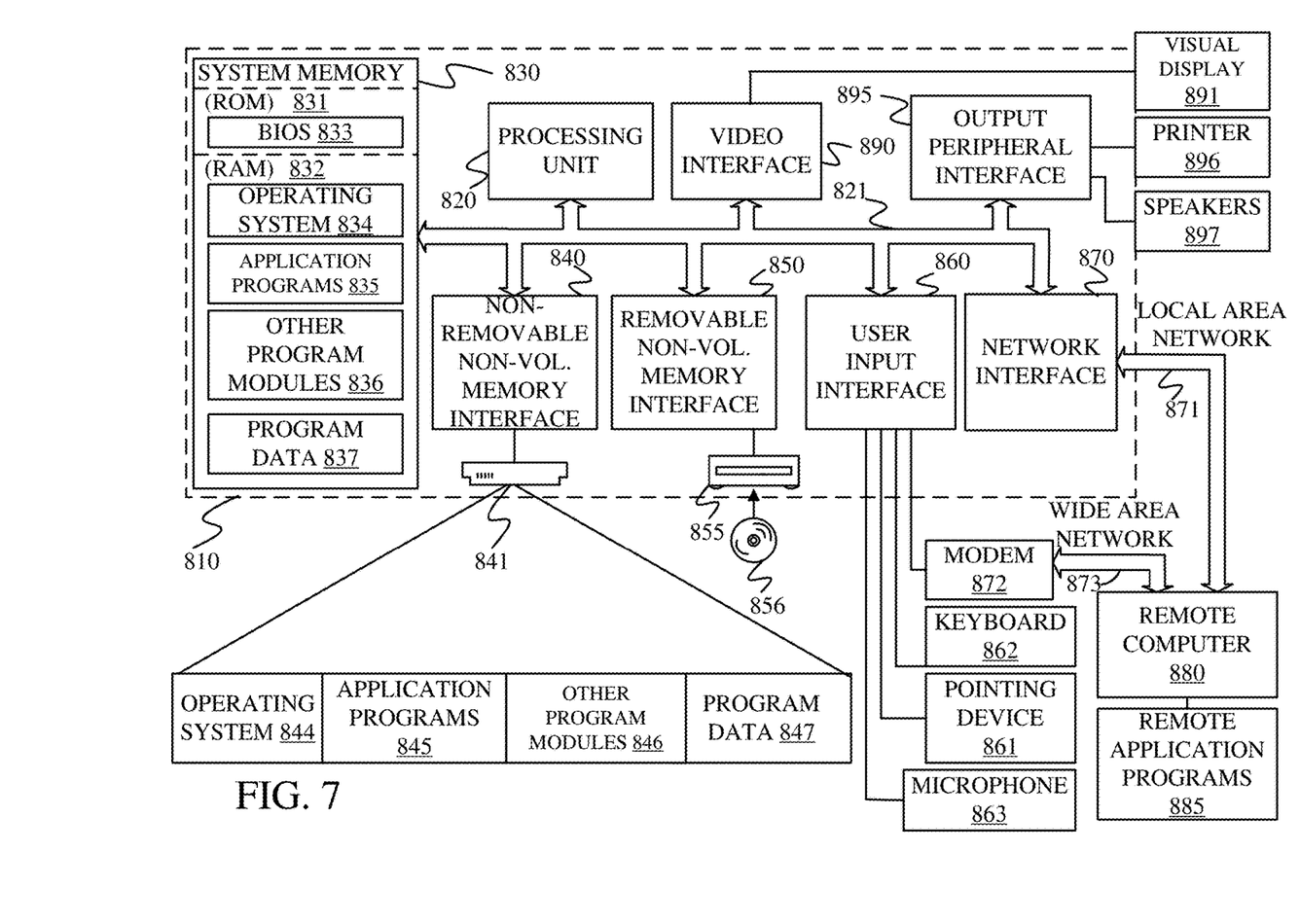
FIG. 7 is a block diagram showing one example of a computing environment that can be used in the architectures illustrated in the previous Figures.

FIG. 7 is one example of a computing environment in which architecture 100, or parts of it, (for example) can be deployed. With reference to FIG. 7, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

web application interaction logic, in a local authority service running on a user machine, that interacts with a web application running on the user machine to receive a redirected authentication request from the web application, requesting authentication to a remote computing system;

hardware key reader interaction logic, in the local authority service, that, based on the authentication request, interacts with a hardware key reader to obtain a representation of a hardware-protected key corresponding to a user; and secure backend communication logic that provides a token generated, at least in part, based on the hardware-protected key, to authentication logic at a backend system of the remote computing system and that receives an operation result performed by the authentication system using the token, the web application interaction logic posting the operation result to the web application in response to the authentication request.

Example 2 is the computing system of any or all previous examples wherein the web application interaction logic is configured to post the operation result to the web application using a standard hypertext transfer protocol (http) post.

Example 3 is the computing system of any or all previous examples and further comprising:

token generator logic, on the local authority service, configured to issue, as the token, a claim-based token corresponding to the user.

Example 4 is the computing system of any or all previous examples and further comprising:

signing logic, on the local authority service, configured to sign the claim based token with the representation of the hardware-protected key.

Example 5 is the computing system of any or all previous examples and further comprising:

local service creation logic configured to generate the local authority service on the user machine.

Example 6 is the computing system of any or all previous examples wherein the hardware key reader comprises:

a smart card reader.

Example 7 is the computing system of any or all previous examples wherein the web application is configured to be redirected to the local authority service by a standard http redirect command.

Example 8 is the computing system of any or all previous examples wherein the web application is configured to be redirected by posting the authentication request, using a standard http post, to a local host endpoint that is monitored by the local authority service.

Example 9 is the computing system of any or all previous examples and further comprising:

a user experience (UX) controller configured to generate user interface display prompting the user to enter the hardware protected key using the smart card reader.

Example 10 is a computer implemented method, comprising:

running a local authority service on a user machine to interact with a web application running on the user machine;

receiving, at the local authority service, a redirected authentication request from the web application, requesting authentication to a remote computing system;

using the local authority service to, based on the authentication request, interact with a hardware key reader to obtain a representation of a hardware-protected key corresponding to a user;

providing a token generated, at least in part, based on the hardware-protected key, to authentication logic at a backend system of the remote computing system;

receiving, at the local authority service, an operation result performed by the authentication system using the token; and posting the operation result to the web application in response to the authentication request.

Example 11 is the computer implemented method of any or all previous examples wherein posting the operation result comprises:

posting the operation result to the web application using a standard hypertext transfer protocol (http) post.

Example 12 is the computer implemented method of any or all previous examples and further comprising:

issuing, as the token, a claim-based token corresponding to the user, from the local authority service.

Example 13 is the computer implemented method of any or all previous examples and further comprising:

signing, with the local authority service, the claim based token with the representation of the hardware-protected key.

Example 14 is the computer implemented method of any or all previous examples and further comprising:

generating the local authority service on the user machine.

Example 15 is the computer implemented method of any or all previous examples wherein using the local authority service to interact with a hardware key reader comprises:

interacting with a smart card reader.

Example 16 is the computer implemented method of any or all previous examples wherein receiving a redirected authentication request comprises:

receiving the redirected authentication request by a hypertext transfer protocol (http) redirect command.

Example 17 is the computer implemented method of any or all previous examples wherein receiving a redirected authentication request comprises:

receiving the redirected authentication request by a posting of the authentication request, using a hypertext transfer protocol (http) post, to a local host endpoint that is monitored by the local authority service.

Example 18 is the computer implemented method of any or all previous examples wherein interacting with a smart card reader comprises:

generating a user interface display prompting the user to enter the hardware protected key using the smart card reader.

Example 19 is a data center computing system comprising:

web application interaction logic configured to redirect an authentication request from a web application running on a user machine to a local authority service running on the user machine, with a standard hypertext transfer protocol (http) re-direct action; and a backend system that includes authentication logic configured to receive a signed claim-based token, signed with a hardware protected key corresponding to a user, from the local authority service running on the user machine and to generate an operation result based on the signed claim based token and to return the operation result to the local authority service, wherein the web application interaction logic is further configured to interact with the web application, using the operation result, to authenticate the user to the data center computing system.

Example 20 is the data center computing system of any or all previous examples wherein the web application interaction logic is configured to expose an interface that is invoked by the web application using interactions that conform to the hypertext transfer protocol.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   at least one processor on a user machine; and
   memory storing instructions executable by the at least one processor on the user machine, wherein the instructions, when executed, provide:
   web application interaction logic, in a local authority service running on the user machine, wherein
      the web application interaction logic is configured to interact with a web application running on the user machine to receive an authentication request from the web application, and
      the authentication request requests authentication to a remote computing system, that is remote from the user machine;
   hardware key reader interaction logic, in the local authority service, wherein the hardware key reader interaction logic is configured to, based on the authentication request, interact with a hardware key reader to obtain a representation of a hardware-protected key corresponding to a user; and
   secure backend communication logic, in the local authority service, configured to:
      provide a token to an authentication system of the remote computing system, the token being generated based, at least in part, on the hardware-protected key; and
      receive an operation result performed by the authentication system using the token,
   wherein the web application interaction logic is configured to provide an indication of the operation result to the web application, and the web application interaction logic is configured to interact with a plurality of different web applications.

2. The computing system of claim 1 wherein the web application interaction logic is configured to post the operation result to the web application.

3. The computing system of claim 2 wherein the instructions, when executed, provide:
   token generator logic, on the local authority service, configured to issue, as the token, a claim-based token corresponding to the user.

4. The computing system of claim 3 wherein the instructions, when executed, provide:
   signing logic, on the local authority service, configured to sign the claim-based token with the representation of the hardware-protected key.

5. The computing system of claim 2, wherein the web application interaction logic is configured to post the operation result to the web application using a standard hypertext transfer protocol (http) post.

6. The computing system of claim 1 wherein the hardware key reader comprises:
   a smart card reader.

7. The computing system of claim 6 wherein the instructions, when executed, provide:
a user experience (UX) controller configured to generate user interface display prompting the user to enter the hardware protected key using the smart card reader.

8. The computing system of claim 1 wherein the authentication request comprises a redirected authentication request that is redirected to the web application interaction logic by the remote computing system.

9. The computing system of claim 8 wherein the web application is configured to be redirected to the local authority service by posting the authentication request, using a standard http post, to a local host endpoint that is monitored by the local authority service.

10. A computer implemented method, comprising:
running, on a user machine, a local authority service configured to interact with a plurality of different web applications;
receiving, at the local authority service, an authentication request from a particular web application that is running on the user machine, the authentication request requesting authentication to a remote computing system that is remote from the user machine;
using the local authority service to,
based on the authentication request, interact with a hardware key reader to obtain a representation of a hardware-protected key corresponding to a user, and
providing a token to an authentication system of the remote computing system, the token being generated based, at least in part, on the hardware-protected key;
receiving, at the local authority service, an operation result performed by the authentication system using the token; and
providing an indication of the operation result to the particular web application.

11. The computer implemented method of claim 10 wherein providing an indication of the operation result comprises:
posting the operation result to the particular web application.

12. The computer implemented method of claim 11 and further comprising:
issuing, as the token, a claim-based token corresponding to the user, from the local authority service.

13. The computer implemented method of claim 12 and further comprising:
signing, with the local authority service, the claim-based token with the representation of the hardware-protected key.

14. The computer implemented method of claim 11 wherein the local authority service posts the operation result to the particular web application using a standard hypertext transfer protocol (http) post.

15. The computer implemented method of claim 10 wherein using the local authority service to interact with a hardware key reader comprises:
interacting with a smart card reader.

16. The computer implemented method of claim 15 wherein interacting with a smart card reader comprises:
generating a user interface display prompting the user to enter the hardware protected key using the smart card reader.

17. The computer implemented method of claim 10 wherein receiving the authentication request comprises:
receiving a redirected authentication request that is redirected to the local authority service by the remote computing system.

18. The computer implemented method of claim 17 wherein receiving a redirected authentication request comprises:
receiving the redirected authentication request by a posting of the authentication request, using a hypertext transfer protocol (http) post, to a local host endpoint that is monitored by the local authority service.

19. A data center computing system comprising:
at least one processor; and
memory storing instructions executable by the at least one processor, wherein the instructions, when executed, configure the data center computing system to:
interact with a web application running on a user machine;
redirect an authentication request, corresponding to the web application, to a local authority service running on the user machine, with a standard hypertext transfer protocol (http) re-direct action, the local authority service being configured to interact with a plurality of different web applications; and
receive, from the local authority service running on the user machine, a signed claim-based token, signed with a hardware protected key corresponding to a user;
generate an operation result based on the signed claim-based token;
send the operation result to the local authority service; and
interact with the web application, using the operation result, to authenticate the user to the data center computing system.

20. The data center computing system of claim 19 wherein the instructions configure the data center computing system to expose an interface that is invoked by the web application using interactions that conform to the hypertext transfer protocol.

* * * * *